(No Model.) 3 Sheets—Sheet 1.
C. REINHART.
WELDING DIE.
No. 568,043. Patented Sept. 22, 1896.
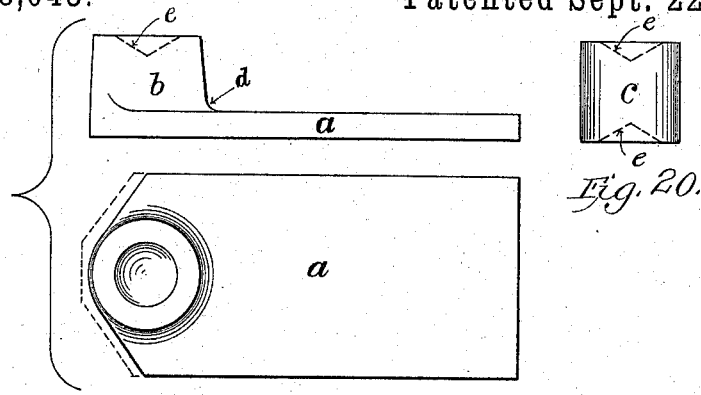
Fig. 20.
Fig. 1.
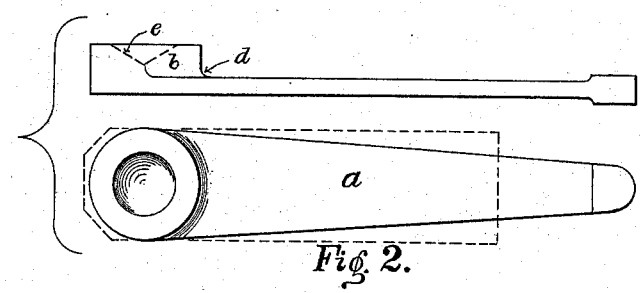
Fig. 2.
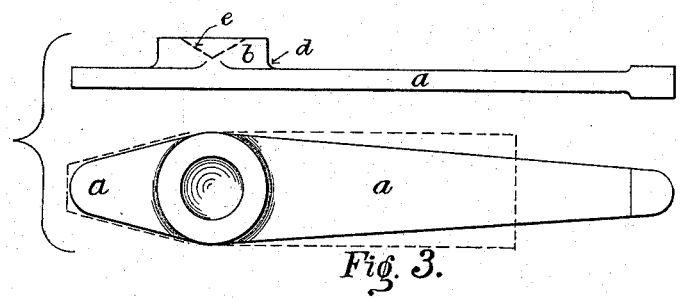
Fig. 3.
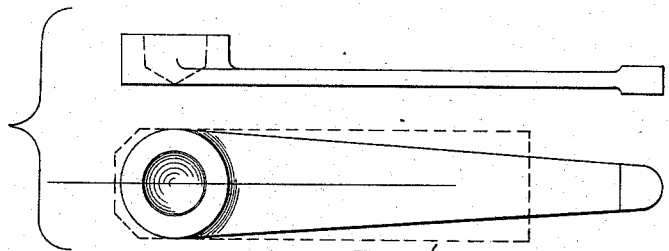
Fig. 4.
WITNESSES:
On. Darley.
INVENTOR
Charles Reinhart
BY F. W. Ritter Jr
his ATTORNEY.

(No Model.) 3 Sheets—Sheet 2.

C. REINHART.
WELDING DIE.

No. 568,043. Patented Sept. 22, 1896.

WITNESSES:
On. Darley
Wm E. Doyne

INVENTOR
Charles Reinhart
BY F. W. Ritter Jr
his ATTORNEY.

(No Model.) 3 Sheets—Sheet 3.

C. REINHART.
WELDING DIE.

No. 568,043. Patented Sept. 22, 1896.

WITNESSES:
M. Darley.
Wm. E. Dyre.

INVENTOR
Charles Reinhart
BY F. W. Ritter Jr.
his ATTORNEY.

UNITED STATES PATENT OFFICE.

CHARLES REINHART, OF ST. LOUIS, MISSOURI, ASSIGNOR TO THE WESTINGHOUSE AIR BRAKE COMPANY, OF PITTSBURG, PENNSYLVANIA.

WELDING-DIE.

SPECIFICATION forming part of Letters Patent No. 568,043, dated September 22, 1896.

Application filed March 26, 1896. Serial No. 584,992. (No model.)

*To all whom it may concern:*

Be it known that I, CHARLES REINHART, a citizen of the United States, residing at the city of St. Louis, State of Missouri, have invented certain new and useful Improvements in Welding-Dies; and I hereby declare the following to be a full, clear, and exact description of the same, reference being had to the accompanying drawings, in which—

Figure 5:
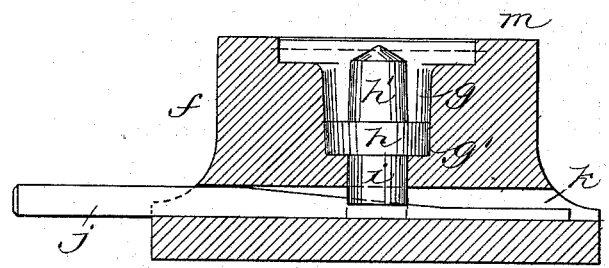
Figure 6:
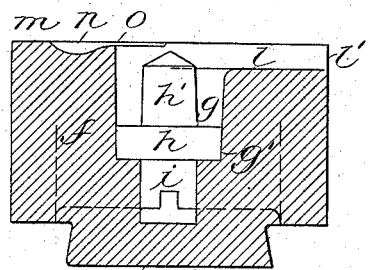
Figure 7:
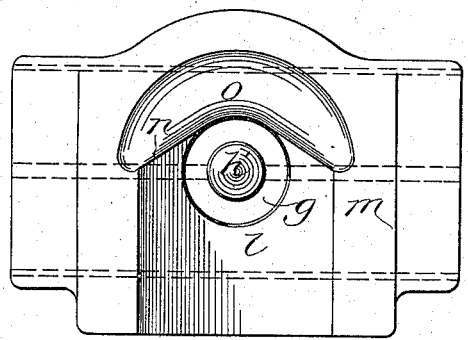
Figure 8:
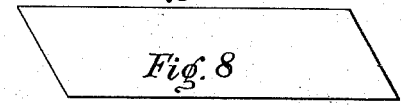
Figure 9:
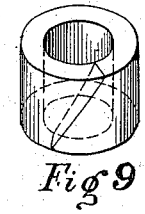
Figure 10:
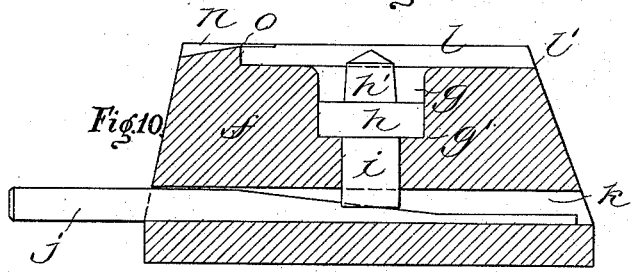
Figure 11:
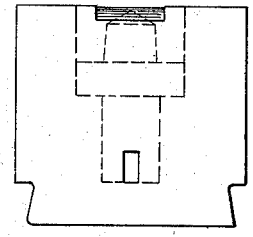
Figure 12:
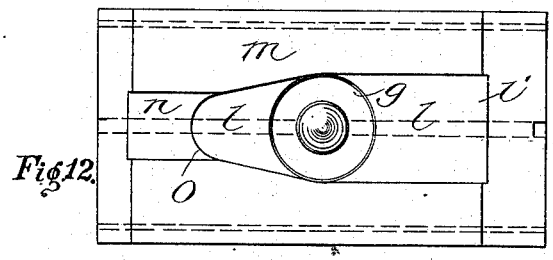
Figure 13:
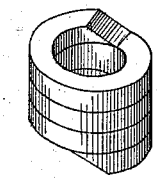
Figures 18, 19:
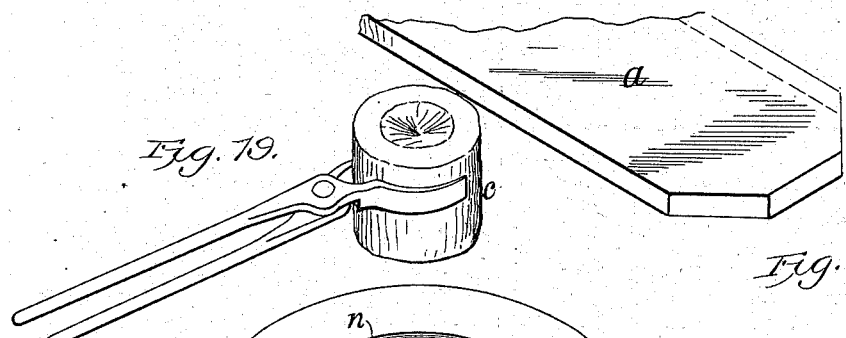
Figure 14:
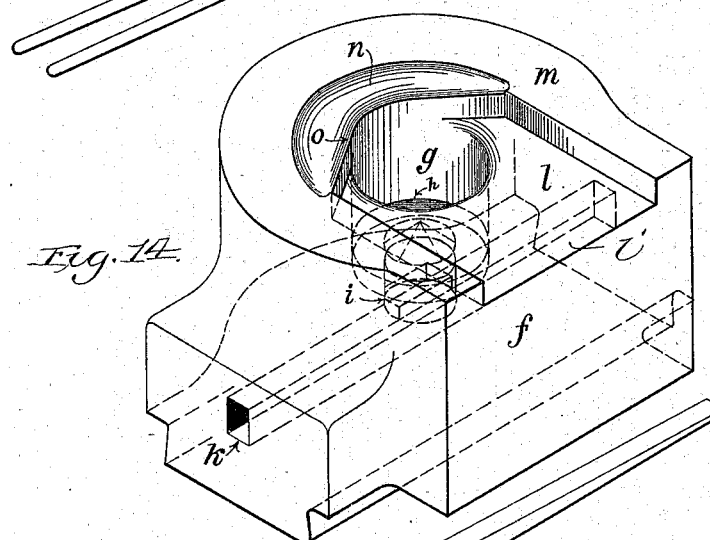
Figures 15, 16:
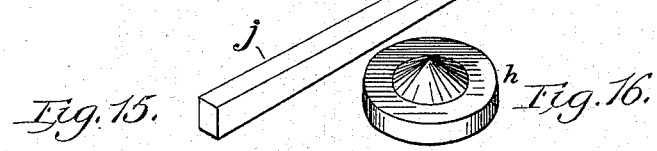
Figure 17:
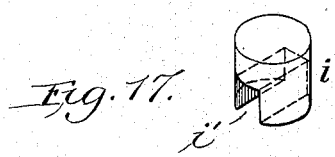

Figures 1 to 4, inclusive, are side and plan views of plates of differing form provided with welded bosses, lugs, or projections, illustrating the character of work to be performed by welding-dies which embody my invention. Fig. 5 is a transverse vertical section of a die embodying my invention. Fig. 6 is a longitudinal vertical section of such a die, taken at right angles to Fig. 5. Fig. 7 is a top plan view of the die shown in section in Figs. 5 and 6. This figure shows the preferred outline of the cavities of the die for welding a boss to a wide plate, such as is shown in Fig. 1 of the drawings. Fig. 8 is a plan view of one form of blank which may be used for welding a hollow boss upon a plate. Fig. 9 is a perspective view of the blank shown in Fig. 8, after the same has been bent to cylindrical form previous to its introduction into the die. Fig. 10 is a longitudinal vertical section; Fig. 11 a rear elevation, and Fig. 12 a top plan view, of a welding-die embodying my invention, showing the preferred outline of the die-cavities where a boss is to be welded to a narrow plate, such as is shown in Fig. 3 of the drawings. Fig. 13 is a perspective view of a coiled blank for hollow bosses. Fig. 14 is a perspective view of the welding-die shown in Figs. 5, 6, and 7. Fig. 15 is a detached perspective view of the key or wedge used for removing the finished article from the die. Fig. 16 is a detached perspective view of a disk for closing the bottom of the boss-cavity of the die. Fig. 17 is a detached perspective view of the key-plug which is interposed between the key or wedge and under side of the disk which forms the bottom of the boss-cavity of the die for supporting and raising said disk. Fig. 18 is a view of a plate, partly broken away; and Figs. 19 and 20 are views of a blank for forming a solid boss on said plate.

Like symbols refer to like parts wherever they occur.

My invention relates to the construction of dies for welding lugs or bosses—either solid or hollow—to plates, as, for instance, in the manufacture of fulcrum-brackets or like devices where the plate and lug or boss are of such size as to require the use of a power-hammer for expeditious welding. In the manufacture of fulcrum-brackets and similar articles of considerable size, where a lug or boss is to be welded to a plate or bar, the article cannot be expeditiously or effectively welded by hand, so resort is commonly had to a power-hammer, and in such an operation it is essential to preserve the relative position of the parts during the operation of the power-hammer, and after the operation of welding it becomes necessary to remove the surplus metal, which cannot be worked in and shaped up—as in hand-welding—all of which as now practiced involves the expenditure of much strength as well as time and labor in the subsequent finishing up of the blank, which it is the purpose of the present invention to obviate.

To this end my invention, generally stated, consists in a power welding-die for uniting or welding two pieces of metal at an angle one to the other, said die having in its upper surface a plate-channel open at its front for the reception of the bar or plate to which the lug or boss is to be welded, a boss or lug well, and an anchor-recess adjacent to and which communicates with the boss or lug well, which anchor-recess serves to receive the overflow or surplus metal and thereof forms an anchor whereby the relation of the parts to be welded is maintained during the welding operation.

There are other minor features of invention, all as will hereinafter more fully appear.

I will now proceed to describe my invention more fully, so that others skilled in the art to which it appertains may apply the same.

In the drawings, *a* indicates a plate of any desired shape, (see Figs. 1 to 4,) to which a boss, lug, or projection *b* is to be welded, the point of union being occupied by a fillet *d*, though, if desired, the parts may unite at a right angle, the fillet being omitted. The boss or lug may be either solid or hollow, and the blank therefor may be either solid or hollow. If solid, said blank (c, Figs. 19 and 20) may be slightly cupped at the ends, as at e e, which facilitates the formation of fillet d in welding, and also centers the tool which may be subsequently used in case the lug or boss b is for any reason bored out after welding. If, however, a hollow-boss blank is desired, it is preferably obtained by bending a blank having the form of a parallelogram, (see Figs. 8 and 9,) or by coiling a bar having scarfed ends, as shown in Fig. 13 of the drawings.

Having pointed out the character of the work, I will now proceed to describe the dies devised by me for accomplishing it, referring especially to Figs. 5, 6, 7, 10, 11, 12, 14, 15, 16, and 17 as illustrating embodiments thereof.

The body of the die f, which may be a cast-iron or other suitable metal block of any desired form, has its horizontal upper surface channeled or indented, as at l, the outline of said channel preferably corresponding with the outline of the plate a, to which the lug or boss b is to be welded, said channel being open at the front, as at l', to facilitate the introduction of the plate. In said die-body f, and at such point with relation to the plate-channel l as corresponds with the desired relation of plate and boss in the finished article, is formed a vertical well or lug-cavity g, having an inwardly-projecting annular shoulder or equivalent support g' for a disk h, which disk forms the bottom of the well, lug, or boss cavity g. Below said shoulder the perforation of the die is continued down, though with a less diameter, until it intersects a horizontal key-channel or keyway k and forms a receptacle for the key-plug i, which rests beneath and supports the center of disk h. The bottom of key-plug i is channeled, as at i', (see Fig. 17,) for the reception of an incline or key-bar j, arranged in the key-channel k, which key-bar when driven in after the welding operation serves to lift the key-plug i and disk h, thus lifting and loosening the welded lug or boss and attached plate, freeing the same to facilitate removal from the die.

In case a solid lug or boss is to be welded to the plate, the disk h may be of the general form shown in Fig. 16—the slight central elevation being desirable, though not essential; but in case a hollow boss is to be welded to the plate (see Figs. 9 and 11) the center of the disk will be occupied by a post or mandrel h', (see Figs. 5, 6, 7, 10, and 12,) which can be either integral with or detachable from the disk h, as preferred, and after the welding operation can be removed from the welded lug in the usual manner.

In the horizontal upper surface m of the die immediately beyond the line where the plate-channel l terminates I provide a cavity, anchor-recess, or overflow-well n for the reception of the surplus metal which is forced out of the lug-cavity g by the blow of the welding-hammer. By the first blow of the hammer an anchor is formed which thereafter serves to prevent the shifting of the plate on the boss under the subsequent blows of the welding operation, and in order to demark or separate said overflow from the lug and plate I form the inner wall of the anchor-recess or overflow-well with an acute angle or edge, as at o, thus facilitating the final finishing of the welded plate and boss.

The mode of using the die is as follows: Withdraw the key-bar j and arrange the disk h in the bottom of the boss-cavity g. If the boss is to be forged solid, and subsequently to be bored out and made cylindrical, a disk with a slight conical projection may be used. The projection will produce a corresponding depression in the end of the boss suitable to receive the point of a drill. If the boss is to be cylindrical, or to be hollow in some other form, and if such hollow interior is to be formed from a curved blank at the same time that the weld is made, (a procedure found in practice to be an economical one,) then a disk h with mandrel h' of suitable form may be arranged in the boss-cavity. The die is then ready for the operation of welding. First, the metal intended to form the boss, whether it is to be solid or hollow, suitably heated, is placed in the cavity intended to form the boss, but it should be of sufficient quantity to extend somewhat upward above the lower plane of the plate-channel l. Upon this is then immediately laid the end of the bar or plate, also suitably heated, so as to be situated immediately over the channel l, with which it should correspond in dimension, in position to be forced into the panel. The power-hammer is then applied, and with the first stroke thereof the surplus metal will be forced over into the anchor-recess or overflow-well and thus form an anchor to hold the plate from longitudinal movement toward the open end of the open plate-channel—thus avoiding the resistance which the surplus metal would encounter in the direction of the space where the anchor-recess or overflow-well is situated. By reason of the fact that a portion of the metal is bent over into the anchor-recess or overflow-receptacle, such bent-over portion or claw serves to hold and anchor the mass until the welding is complete, and, at the same time, as the welding approaches completion the cutting edge almost severs the fin or claw from the rest of the metal. The overflow-cavity in a power welding-die therefore becomes an anchor-recess to preserve the proper relation of the parts during the welding operation. The pieces forged together may be removed from the die by driving in the key-bar j, which will, by impact upon the key-plug i and disk h, force upward the boss and plate, so as readily to be removed.

Having thus described my invention, what I claim, and desire to secure by Letters Patent, is—

1. A power welding-die having a vertical boss-well, and in its upper surface a plate-channel open at the front, and an anchor-recess which communicate with the boss-well, substantially as and for the purposes specified.

2. The combination with a power welding-die having a boss-well and an anchor-recess adjacent thereto, of a movable disk bottom for the boss-well, and means for elevating the disk bottom to disengage the welded article from the boss-well and anchor-recess, substantially as and for the purposes specified.

In testimony whereof I affix my signature, in presence of two witnesses, this 24th day of March, 1896.

CHARLES REINHART.

Witnesses:
J. R. WILLIAMS,
CHARLES C. HIGHAM.